(12) United States Patent
Zhang (10) Patent No.: US 9,551,259 B1
(45) Date of Patent: *Jan. 24, 2017

(54) METHOD AND SYSTEM FOR DIESEL PARTICULATE FILTER DIAGNOSTICS

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/836,573

(22) Filed: Aug. 26, 2015

(51) Int. Cl.
*F01N 3/023* (2006.01)
*F01N 9/00* (2006.01)
*F02P 5/145* (2006.01)
*F02D 41/02* (2006.01)

(52) U.S. Cl.
CPC ............. *F01N 9/002* (2013.01); *F01N 3/023* (2013.01); *F02D 41/029* (2013.01); *F02P 5/145* (2013.01)

(58) Field of Classification Search
CPC .. F01N 9/002; F01N 2900/1606; F01N 3/021; F01N 3/023; F01N 2550/04; F01N 13/008; F01N 2900/0416
USPC .................................................. 60/295, 311
See application file for complete search history.

(56) References Cited

U.S. PATENT DOCUMENTS

| 7,735,314 | B2 | 6/2010 | Lu et al. | |
| 8,151,560 | B2 | 4/2012 | Zanini-Fisher et al. | |
| 8,209,962 | B2 | 7/2012 | Sun et al. | |
| 8,310,249 | B2 | 11/2012 | Paterson | |
| 8,490,383 | B2 | 7/2013 | Laermann et al. | |
| 8,770,016 | B2* | 7/2014 | Uchiyama | F01N 11/002 73/114.75 |
| 9,399,943 | B1* | 7/2016 | Zhang | F01N 13/08 |
| 2008/0087011 | A1* | 4/2008 | Konstandopoulos | F01N 3/027 60/311 |
| 2008/0087012 | A1* | 4/2008 | Konstandopoulos | F01N 3/0222 60/311 |
| 2008/0098724 | A1* | 5/2008 | Konstandopoulos | F01N 3/0222 60/278 |
| 2010/0199839 | A1* | 8/2010 | Zhang | F01N 3/0233 95/23 |
| 2010/0242455 | A1* | 9/2010 | Konstandopoulos | F01N 13/0093 60/311 |
| 2010/0242456 | A1* | 9/2010 | Konstandopoulos | F01N 13/0093 60/311 |
| 2011/0061367 | A1* | 3/2011 | Laermann | F01N 3/035 60/277 |
| 2011/0232362 | A1* | 9/2011 | Thiagarajan | B01D 46/0086 73/23.33 |
| 2012/0090304 | A1 | 4/2012 | Kotrba et al. | |
| 2013/0031967 | A1* | 2/2013 | Ichimasa | F01N 11/00 73/114.71 |

* cited by examiner

*Primary Examiner* — Patrick Maines
(74) *Attorney, Agent, or Firm* — Julia Voutyras; Alleman Hall McCoy Russell & Tuttle LLP (57) ABSTRACT

Methods and systems are provided for determining degradation of a particulate filter in an exhaust conduit. In one example, a method may include diverting exhaust gas to a secondary soot sensor assembly downstream of a first filter, comprising a filter and determining degradation based on time intervals between subsequent filter regenerations of the second filter in the secondary soot sensor assembly.

17 Claims, 4 Drawing Sheets

METHOD AND SYSTEM FOR DIESEL PARTICULATE FILTER DIAGNOSTICS

FIELD

The present description relates generally to the design and use of sensors for diagnosing a Diesel Particulate Filter (DPF).

BACKGROUND/SUMMARY

Engine combustion using diesel fuel may generate particulate matter (PM) (such as soot and aerosols) that can be exhausted to the atmosphere. To enable emissions compliance, diesel particulate filters (DPFs) may be included in the engine exhaust, to filter out exhaust PMs before releasing the exhaust. In addition, one or more soot sensors may be used to diagnose the DPFs and such soot sensors may be coupled upstream and/or downstream of the DPF.

As such, various types of soot sensors have been developed to sense soot production and release. One example approach shown by Paterson in U.S. Pat. No. 8,310,249 discloses soot sensors that collect particulate matter on charged electrodes. The soot sensor comprises opposed electrodes separated by an insulator with a gap in between to prevent current flow. When soot particles start to accumulate on the sensor, a bridge is created between the electrodes allowing for current to flow. The change in current is used as an indication for soot deposition.

However, the inventors herein have recognized potential disadvantages with the above approach. As one example, non-uniform or low soot deposit on the surface can occur due to biased flow distribution across the sensor surface, resulting in inaccurate voltage and current readings across the gap. Additionally, it may be difficult to reach sensor regeneration temperatures due to large flow impingement on the surface in some sensor designs. Further still, the sensor may become contaminated due to impingement of large diesel particulates or water droplets on the surface of sensor electrodes. Contamination may also be caused by the large diesel particulates or water droplets infiltrating into the inner protection tube of the sensor.

In addition to electrode-based sensors, pressure-based soot sensors have also been developed. For example, as described by Sun et al. in U.S. Pat. No. 8,209,962, differential pressure across a particulate filter may be used for monitoring filter performance. Therein, when the differential pressure is less than a threshold, a leak in the particulate filter may be determined. However, this method may also suffer from interference from large aggregated particulates or water droplets impinging on the sensor.

The inventors herein have identified an approach by which the issues described above may be at least partly addressed. One example method includes: diverting exhaust gas from downstream of a first filter into each of parallel first and second pathways, the second pathway including a second filter coupled to an electric circuit; and indicating degradation of the first filter based on an interval between successive regenerations of the second filter. In this way, DPF diagnostics may be performed with higher accuracy and reliability without the results being corrupted by flow and soot loading distribution or impingement of droplets.

As an example, exhaust gas may be diverted from a main exhaust pipe, downstream of a DPF, into two parallel conduits (a first and a second exhaust pathway) outside of the main exhaust pipe via an inlet pipe. The inlet pipe may include perforations that allow water droplets and aggregated particulates to be trapped and released into the tailpipe. The second exhaust pathway may be fitted with a metallic particle filter (MPF) and an electric circuit may be coupled to the filter. Further, the two pathways may merge at a location downstream of the filter, wherefrom exhaust is returned to the main exhaust pipe. As exhaust gas diverted from the main exhaust pipe is received in the two parallel pathways, exhaust PMs, such as soot, may be deposited on the MPF of the second pathway, while exhaust containing soot flows unobstructed through the first pathway. As a result a pressure and/or temperature difference is generated, which is measured by a pressure or temperature sensor coupled to the two pathways. Once the pressure or temperature difference reaches a threshold, the electric circuit coy pled to the MPF is closed to initiate regeneration of the filter. Regeneration completion is indicated based on a drop in the pressure or temperature difference. Further, a time interval elapsed between successive regenerations is learned. As such, if the DPF becomes degraded (such as due to age or durability issues), an increasing amount of soot may escape from the DPF, and travel onto the metal filter. As a result, the metal filter may have to be cleaned more frequently. Thus, based on a decrease in the time interval elapsed between successive regenerations of the metal filter in the second exhaust pathway, degradation of an upstream DPF may be determined, and appropriate actions may be taken.

In this way, by diverting a portion of exhaust gas from an exhaust pipe to a soot sensor with a metal filter, located downstream of a diesel particulate filter, degradation of a particulate filter can be detected based on an amount of soot leaking from the particulate filter onto the metal filter. The technical effect of trapping soot particles on the metal filter selectively included in one of the two pathways, is that a differential pressure or differential temperature between the pathways can be advantageously used to learn the soot load of the metal filter. The technical effect of trapping aggregated particulates and water droplets in an inlet pipe of the soot sensor, and redirecting them to the exhaust tailpipe, is that impingement of aggregated particulates and water droplets on the soot sensor is reduced, allowing for more accurate and reliable soot detection. By relying on a time interval between successive regenerations of the metal filter to detect DPF degradation, is the diagnostics may be rendered more sensitive and less affected by variations in soot loading distribution on the metal filter. Overall, accuracy and reliability of soot sensing and diagnosing of an exhaust particulate filter is increased, enabling higher emissions compliance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
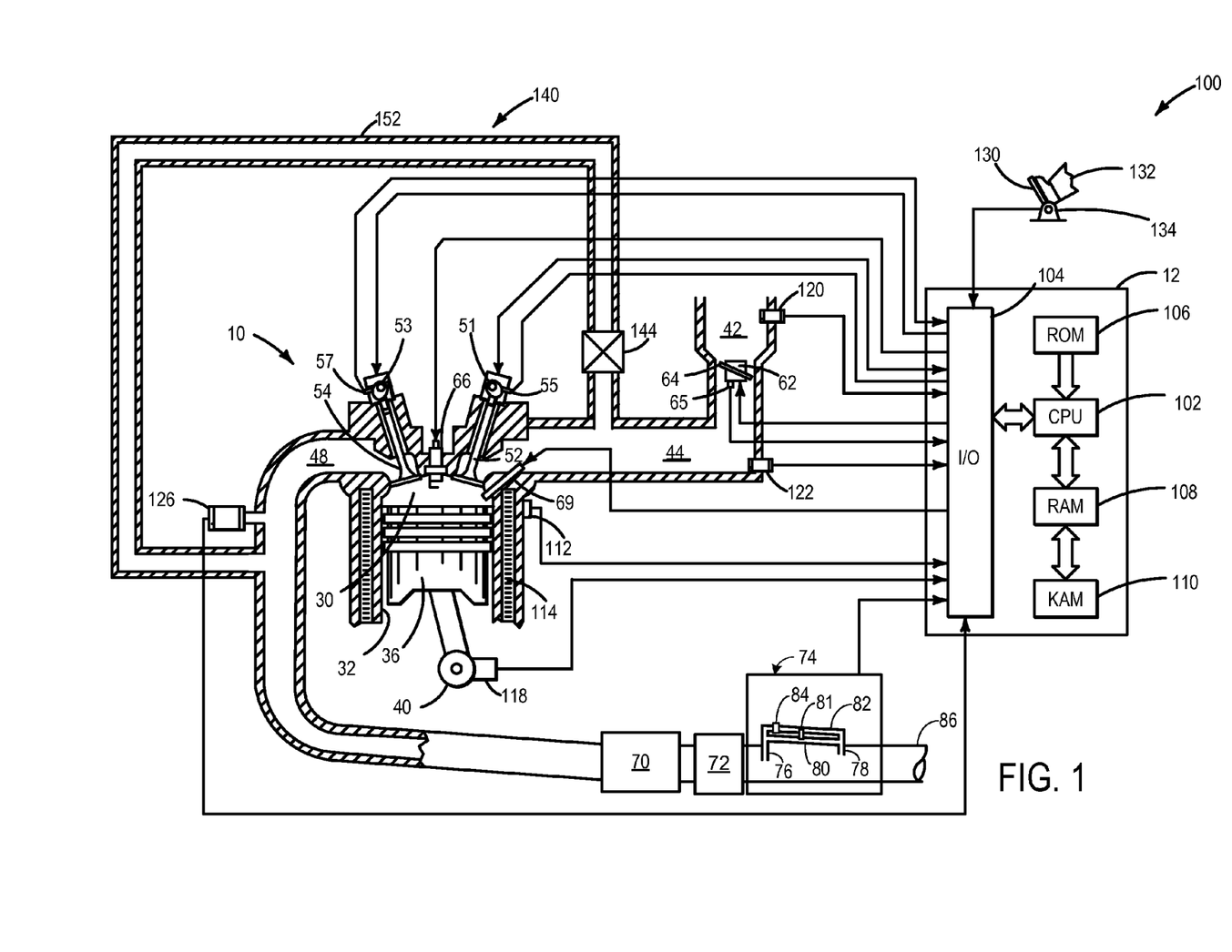
FIG. 1 shows an example engine system with a pressure or temperature-based exhaust soot sensor positioned downstream of a diesel particulate filter (DPF).
Figure 2:
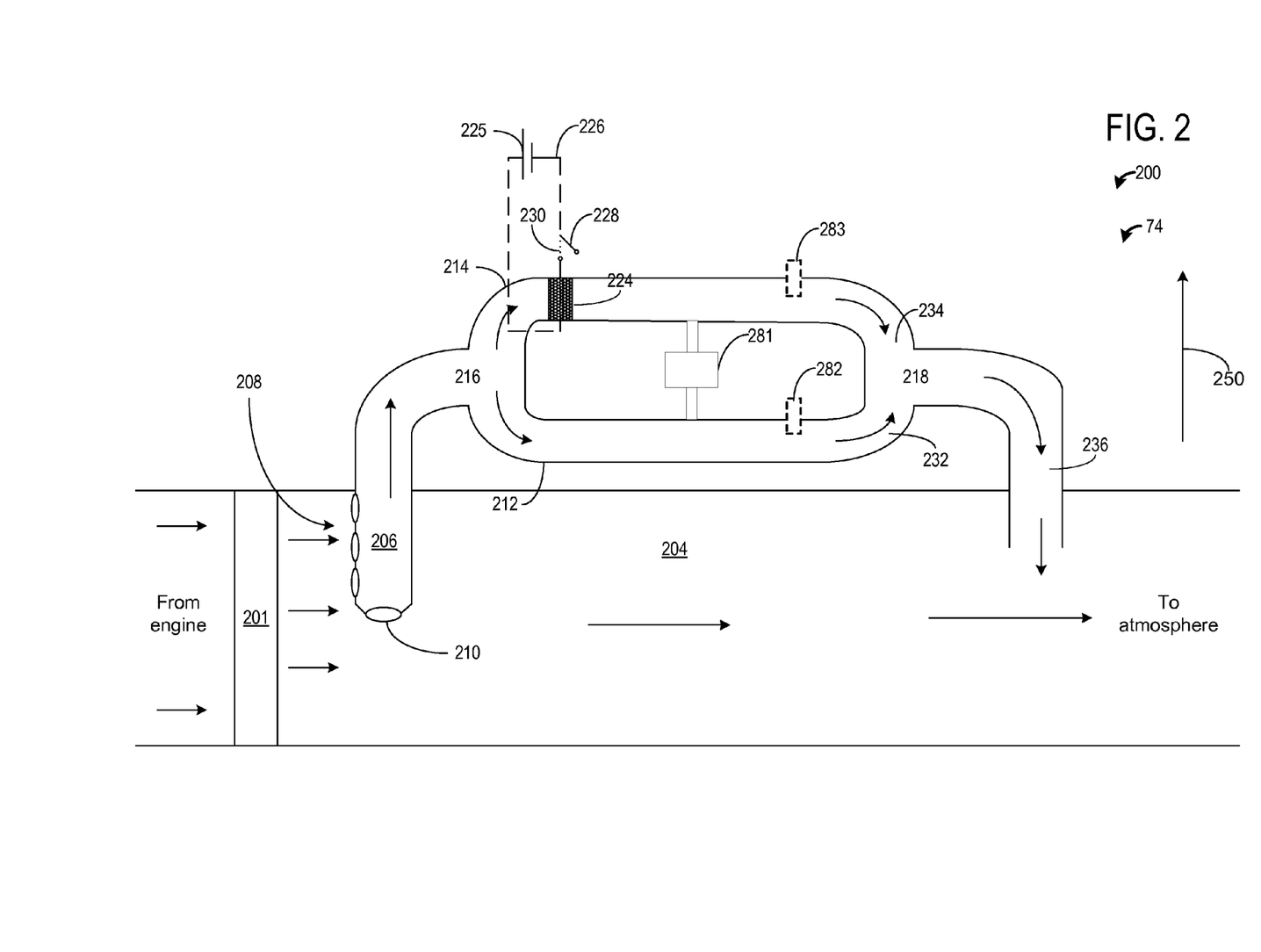
FIG. 2 shows an example embodiment of the pressure or temperature-based exhaust soot sensor assembly of FIG. 1.

The following description relates to systems and methods for determining degradation of an exhaust DPF based on the output of a differential pressure or differential temperature based soot sensor coupled downstream of the DPF. A vehicle system comprising of an engine configured to operate with fuels such as diesel is shown in FIG. 1. The DPF is disposed in the main exhaust pipe, and downstream from the DPF, a secondary soot sensor assembly is positioned to detect leakage of particulates from the DPF. The secondary soot sensor assembly, as shown in FIG. 2, may include two parallel flow branches, one of which is fitted with a metal filter, and an associated electric circuit. One or more pressure and/or temperature sensor(s) are provided for measuring the differential pressure or differential temperature across the two parallel flow branches. An engine controller is configured to perform a control routine, such as the example routine of FIG. 3, to regenerate the metal filter based on the differential pressure or temperature, and diagnose the DPF based on a frequency of regeneration of the metal filter. An example diagnosis is shown with reference to FIG. 4. In this way, DPF health may be diagnosed more accurately and reliably.

FIG. 1 is a schematic diagram showing one cylinder of a multi-cylinder engine 10 in an engine system 100, which may be included in a propulsion system of an automobile. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 includes a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage (e.g., exhaust pipe) 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber (as shown) or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of both an exhaust gas recirculation system 140 and an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is UEGO configured to provide output, such as a voltage signal, that is proportional to the amount of oxygen present in the exhaust. Controller 12 converts oxygen sensor output into exhaust gas air-fuel ratio via an oxygen sensor transfer function.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The emission control device 70 is shown arranged along the exhaust passage 48 downstream of the exhaust gas sensor 126. The device 70 may be a three way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

A particulate filter 72 is shown arranged along the exhaust passage 48 downstream of the emission control device 70. Exhaust gas treated by emission control device 70 and particulate filter 72 is released into the atmosphere through tailpipe 86. The particulate filter 72 may be a diesel particulate filter or a gasoline particulate filter. A substrate of the particulate filter 72 may be made of ceramic, silicon, metal, paper, or combinations thereof. During operation of the engine 10, particulate filter 72 may capture exhaust particulate matter (PMs), such as ash and soot (e.g., from unburned hydrocarbons) in order to reduce vehicle emissions. The soot may clog the surfaces of the particulate filter thereby creating an exhaust backpressure. The exhaust backpressure may negatively influence the engine performance. Once the particulate filter 72 becomes fully loaded with soot (e.g., soot load on the particulate filter exceeds a soot load threshold), the backpressure may be too high for proper exhaust expulsion. Work used to expel exhaust from the engine 10 increases in order to overcome the backpressure described above. In order to avoid high backpressure, an engine 10 may periodically regenerate the filter either passively or actively.

Passive regeneration may occur when an engine load exceeds a threshold load causing an exhaust temperature to rise. As the exhaust temperature increases beyond a threshold temperature (e.g., 450° C.), the soot on the particulate filter 72 may combust. Therefore, passive regeneration occurs without alterations to engine operations. Conversely, active regeneration occurs via the controller 12 signaling for alterations to engine operations in order to increase exhaust temperatures (e.g., late injection, secondary injection, throttling, exhaust recirculation, spark retard, and/or a decrease in air/fuel ratio) independent of the engine load. For example, the controller may send signals to a fuel injector to increase the pulse-width of the fuel injection, and enrich the combustion air-fuel ratio (relative to stoichiometry). As another example, the controller may send signals to an electromechanical actuator coupled to the intake throttle to move the throttle valve towards a more open position, thereby increasing airflow to the engine. In still other examples, valve timing may be adjusted (e.g., via cam adjustments) to increase positive valve overlap.

As the soot burns during either passive or active regeneration, the particulate filter temperature increases to a higher temperature (e.g., 1400° C.). Extended engine operation at the elevated regeneration temperature may expedite degradation of the particulate filter 72. Degradation may include the particulate filter 72 developing a leak (e.g., crack) and/or a hole, which may cause soot to escape from the filter, and flow further downstream into the exhaust passage 48, increasing vehicle emissions. As such, this can cause an engine to be emissions non-compliant.

Other factors contributing to particulate filter degradation include vehicle vibrations and lubricating oil ash. Vehicle vibrations may degrade fragile components within the particulate filter 72 due to expansion of the components (i.e., decreased stability) caused by exposure of the particulate filter 72 to high temperatures. Lubricating oil ash may contain metal oxides which can react with the particulate filter 72 and form phases (e.g., portions of the particulate filter degrade while other portions remain functional), ultimately degrading at least a portion of the particulate filter.

Diagnosis of particulate filter 72 may be enabled through the use of a secondary soot sensor assembly and an associated pressure or temperature-based soot sensor. A secondary soot sensor assembly 74 is shown arranged along the exhaust passage 48 downstream of the particulate filter 72. The secondary soot sensor assembly 74 comprises an inlet pipe 76 positioned partially within the exhaust passage 48, at an end of the secondary soot sensor assembly 74 nearest the particulate filter 72. The secondary soot sensor assembly 74 further comprises an outlet pipe 78 positioned partially within the exhaust passage 48, at an opposite end of the secondary soot sensor assembly 74 farthest away from the particulate filter 72.

The inlet pipe 76 and the outlet pipe 78 are fluidly coupled to the exhaust passage 48 such that at least a portion of exhaust gas flows from the exhaust pipe into the inlet pipe, at a location downstream of particulate filter 72, and then from the outlet pipe back into the exhaust pipe, at a location upstream of an exhaust tailpipe. Further, the flow assembly includes a first pathway 80 and a second pathway 82, the first and second pathways diverging downstream of inlet pipe 76, and converging again upstream of outlet pipe 78. In one example, first pathway 80 and second pathway 82 may be parallel and substantially equal to one another in geometrical structure (that is, they may have the substantially same length, width, and diameter, and further may be made of the same material). However, in alternate examples, the pathways may be substantially parallel and/or may have different geometrical structures. Both the first pathway 80 and the second pathway 82 are located outside of the exhaust passage 48, but receive exhaust gas from the exhaust passage 48 via inlet pipe 76. Said another way, the first pathway 80 and second pathway 82 are positioned external to an interior of the exhaust passage 48.

One of the two pathways may include a metal filter therein. In the depicted example, second pathway 82 includes a metal filter 84. The metal filter 84 may be smaller than the particulate filter 72 (that is, smaller in diameter, in width, and/or length). However, the porosity of the metal filter may be the same as or less than the porosity of particulate filter 72. Metal filter 84 may be coupled to an electric circuit (shown in FIG. 2), the electric circuit in turn electronically coupled to controller 12. A detailed embodiment of the secondary soot sensor assembly is described with reference to FIG. 2.

The secondary soot sensor assembly 74 may be used to determine degradation of the particulate filter 72. In particular, soot loading of metal filter 84 may be estimated based on a differential pressure or a differential temperature across the first and second pathways, as estimated by a differential pressure or temperature sensing assembly 81. The differential pressure or temperature sensing assembly 81 may consist of one or more of a differential pressure sensor coupled between the first and second pathways, a pairs of pressure sensors coupled to the first and second pathways respectively, and a pair of temperature sensors coupled to the first and second pathways respectively, the sensors coupled downstream of the metal filter 84. Based on the soot loading, an electric current may be passed through the metal filter to regenerate the filter. Due to the smaller size of the metal filter, the filter may be periodically regenerated. Based on the periodicity of the regeneration, relative to a threshold, leakage of soot from the particulate filter 72 may be determined, as elaborated with reference to FIGS. 2 and 3.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of differential pressure or temperature from pressure or temperature sensing assembly 81 on the secondary soot sensor assembly 74, measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller 12. In one example, the controller 12 closes a switch on the electric circuit (shown in FIG. 2) used for regeneration of the secondary soot sensor assembly 74. In another example, the controller 12 alters an engine operation to limit torque output of a vehicle in response to a signal received from the metal filter 84 of the secondary soot sensor assembly 74.

FIG. 2 shows a schematic view of an example embodiment of a pressure or temperature-based secondary soot sensor assembly 200. In one example, assembly 200 is an embodiment of assembly 74 of FIG. 1 and therefore may share common features and/or configurations as those already described for secondary assembly 74. Secondary soot sensor assembly 200 is fluidly coupled to exhaust pipe 204. Exhaust pipe 204 includes a first particulate filter 201. In one example, the first particulate filter is a larger diesel or gasoline particulate matter filter having a higher soot capacity. The secondary soot sensor assembly 200 is coupled to exhaust pipe 204 downstream of first filter 201. For example, first filter 201 and exhaust pipe 204 may be examples of particulate filter 72 and exhaust passage 48 of FIG. 1.

Exhaust gas flowing from the engine passes through the first filter 201 and reaches the secondary soot sensor assembly 200 located further downstream along the exhaust pipe 204. Solid line arrows indicate a direction of the exhaust flow in the exhaust pipe 204 past the DPF. At least a portion of the exhaust gas flowing through the exhaust pipe 204 gets diverted into the secondary soot sensor assembly 200 via an inlet pipe 206. The inlet pipe bifurcates into a parallel first tube (or first pathway) 212 and second tube (or second pathway) 214 external to the exhaust pipe 204. Further downstream first tube 212 and second tube 214 converge into the outlet pipe 236 external to the exhaust pipe 204. Thus inlet pipe 206 is upstream of first and second tubes 212, 214, while outlet pipe 236 is downstream of first and second tubes 212, 214.

A portion of each of the inlet pipe 206 and outlet pipe 236 is coupled internally to the exhaust pipe 204 and a remaining portion of each of the inlet pipe 206 and outlet pipe 236 is coupled externally to the exhaust pipe 204. The inlet pipe 206 extends though the exterior wall of the exhaust pipe 204 and into the interior of the exhaust pipe 204. In one example, the portion of inlet pipe 206 and outlet pipe 236 internal to exhaust pipe 204 is smaller than the remaining portion of inlet pipe 206 and outlet pipe 236 external to exhaust pipe 204, respectively. In the depicted example outlet pipe 236 has a shorter length relative to inlet pipe 206. In addition, the portion of outlet pipe 236 that dips internal to exhaust pipe 204 is smaller than the portion of inlet pipe 206 that dips internal to exhaust pipe 204.

The inlet pipe 206 comprises a plurality of perforations 208 on a side of the inlet pipe within the exhaust pipe 204 and proximate to the first filter 201. The perforations 208 face the first filter 201 and the direction of the oncoming exhaust gas flow. There are no perforations on the opposite side (wall) of the inlet pipe 206. As a result of this configuration, aggregated particulates and water droplets in the exhaust may impinge the inner face of the inlet pipe, and be released into the exhaust pipe, without affecting a sensitivity of the soot sensing assembly. The center line of the inlet pipe 206 is perpendicular to the center line of the exhaust pipe 204 and the perforations 208 are completely situated inside the exhaust pipe 204. There may be more perforations configured on the inlet pipe 206 as compared to the outlet pipe 236. In one example, there may be no perforations on the outlet pipe 236, as depicted. A perforation 210 is located at the bottom of the inlet pipe 206 within the exhaust pipe 204. The perforation 210 is arranged perpendicular to the perforations 208 on inlet pipe 206. Diameter of the perforations on the inlet tube side wall may be adjusted to enable conglomerated particulates and water droplets in the exhaust gas to impinge on a side of the inlet pipe within the exhaust pipe and distal to the first filter 201, the conglomerated particulates being released from the inlet pipe into the exhaust pipe via a perforation 210 on a bottom of the inlet pipe. In this way, the conglomerated particulates and water droplets can then be released from the inlet pipe 206 into the exhaust pipe via a perforation 210 on a bottom of the inlet pipe reducing contamination and thereby improving the accuracy of the system.

A part of the exhaust gas may flow from the exhaust pipe 204 into an inlet pipe 206 (shown by single solid arrow pointing upwards), and from the inlet pipe 206 into each of the first 212 and second 214 exhaust pathways, the inlet pipe 206 branching into the first 212 and second pathways 214 at a location external to the exhaust pipe 204. The direction of flowing exhaust gas through the inlet pipe 206 and the outlet pipe 236 is substantially perpendicular to a direction of exhaust flow through each of the exhaust pipe 204, and the first 212 and second pathways 214. The portion of the inlet pipe 206 located outside of the exhaust pipe 204 has a lower temperature compared to the part of the inlet pipe 206 located inside the exhaust pipe 204. The temperature drop may cause the water vapor in the exhaust gas to condense on the surfaces of inlet pipe 206. The condensate may fall through the perforation 210 back into the exhaust pipe 204 thereby reducing the entry of water droplets into the secondary soot sensor assembly 200.

Inlet pipe 206 may include a bifurcation 216, resulting in two parallel passages namely first pathway 212 and second pathway 214. The two pathways originating from the bifurcation 216 are substantially symmetric and parallel to each other and parallel to the exhaust pipe 204. The parallel first 212 and second 214 tubes may have substantially equal geometrical dimensions, e.g., length, width, and diameter. The first tube (or pathway) 212 is disposed proximal to the engine exhaust pipe 204 relative to the second tube (or pathway) 214, while the second tube 214 is disposed distal to the engine exhaust pipe 204 relative to the first tube (or pathway) 212. One or more of the first 212 and second 214 tubes may include a venturi. For example, the first and second pathways may each comprise venturi tubes and the soot loading of the metal filter may be of the assembly may be determined based on a ratio of flow rates through the first and second exhaust pathways. The flow rates may be based on pressure drops through respective venturi tubes of the first and second exhaust pathways. However, this approach may require multiple pressure sensors, increasing component cost and complexity. In still further examples, flow of exhaust through one or both of the venturis may be advantageously harnessed by drawing a vacuum at the neck of the venturi, the vacuum stored for later use (e.g., during purging), or applied to a vacuum-actuated engine actuator, such as a brake booster.

A second metal filter 224 is affixed across the second pathway facing perpendicular to the direction of exhaust flow into the second pathway 214 such that the exhaust gas flows through the metal filter 224. In one example, the second filter 224 is a second, smaller metal filter having a lower soot capacity. The second filter 224 is smaller compared to the first filter 201 and is located outside of the exhaust pipe 204 while first filter 201 is housed within exhaust pipe 204. The second filter 224 is located in the first half the second pathway 214 before a central position of the tube. The metal filter surface may be flat and/or disk-shaped, comprising of metal fibers. The metal filter effectively traps soot and particulate matter in its pores as exhaust gas flows through the second pathway 214 to outlet pipe 236. The portion of the exhaust gas entering the first pathway 212 passes through without flowing through any filter.

Metal filter 224 is electrically coupled to a circuit 226 including a switch 228 and a source of electricity 225. In the depicted example, the source of electricity 225 includes a battery (or battery pack). The switch 228 may be alternated between an open position, indicated by a solid line, and a closed position 230, indicated by a dotted line. When the switch 228 is moved to the closed position 230, such as when second metal filter regeneration conditions are met, the circuit 226 is completed and an electric current (drawn from the source of electricity 225) can pass through the metal filter 224 causing an increase in temperature at the filter. The heat generated may be used to regenerate the metal filter 224 by burning off soot captured on the metal filter surface over a period of time. At all times other than during second metal filter regeneration, the switch 228 may be left in the open position. Alternatively, the metal filter 224 and the electric circuit 226 may be positioned in the first pathway and exhaust may flow through the second pathway unobstructed.

In one example embodiment, a differential pressure sensor 281 may be coupled between the first pathway and second pathways at a location that is substantially central of the pathways, and downstream of metal filter 224. The differential pressure sensor 281 may be coupled to the first pathway 212 at a location that is substantially at the same length/distance between the bifurcations 216 and 218 as in the second pathway 214. Given the symmetric geometry of the assembly 200, the static pressure (that is, instantaneous pressure at a particular location) of the exhaust gas at the bifurcations 216 and 218 is equal. The static pressures at the centers of the two pathways, however, may be different due to the presence of the soot deposited on the metal filter 224 in second pathway. Specifically, static pressure at the center of second pathway 214 may be lower than that of the first pathway 212, the pressure in the second pathway falling further below the pressure in the first pathway as the soot load of the second filter increases.

In an alternate example, in place of the differential pressure sensor 281, a pair of sensors may be used to estimate a differential pressure or a differential temperature between the two pathways. For example, a first sensor 282 may be coupled to the first pathway 212 and a second sensor 283 may be coupled to the second pathway 214 downstream of the metal filter 224. In one example, where the first and second sensors are pressure sensors, a difference between the output of the first and second sensors may be used to estimate the differential pressure. In another example, wherein the first and second sensors are temperature sensors, a difference between the output of the first and second sensors may be used to estimate a differential temperature and/or infer the differential pressure. In embodiments where the pair of sensors are temperature sensors, one or more of the temperature sensors may include a thermocouple to detect the temperature of the exhaust gas as it flows through the first and second pathways. In yet another example, the second tube 214 may include a venturi downstream of filter 224.

As soot accumulates in the metal filter over a period of time, the pressure (or temperature) difference ($\Delta P$) between the two pathways increases, and the metal filter may have to be periodically regenerated. Regenerating the second metal filter is based on an output of the pressure/temperature sensor(s). Specifically, a controller may initiate regeneration of the second filter when the output of the pressure/temperature sensor(s) is indicative of a higher than threshold differential pressure or temperature (across the two pathways), and terminating regeneration of the second filter when the output of the pressure/temperature sensor(s) is indicative of a lower than threshold differential pressure or temperature (across the two pathways). As such, since the pressure/temperature difference is indicative of a soot load of the second metal filter, when the pressure/temperature difference between the two pathways reaches a threshold value, such as an upper threshold, it may be determined that the metal filter has to be regenerated. Thus, in response to the output of the pressure/temperature sensor coupled to the first and second pathways, the engine controller may send a signal to actuate switch 228 of the electric circuit 226 to the closed position. On closing the switch 228, the electric circuit is completed and current flows through the metal filter 224 causing an increase in temperature. The heat generated starts burning away the soot deposit and regenerating the metal filter 224. The pressure/temperature difference is simultaneously measured with the differential pressure sensor 281 or with the temperature/pressure sensors 282 and 283. As the soot deposit decreases, the pressure (or temperature) difference $\Delta P$ starts decreasing. When $\Delta P$ reaches a pre-determined second (lower) threshold value, it may be inferred that the metal filter 224 has been sufficiently regenerated and the controller sends a signal to actuate switch 228 of the circuit 226 to the open position, stopping further flow of current and filter regeneration. When the DPF is degraded, more soot travels downstream though the exhaust pipe 204 to the secondary soot sensor assembly 200. As a result, soot accumulates on the metal filter 224 at an increased rate, and regeneration of the metal filter 224 has to be carried out more frequently. Thus by monitoring an interval between successive regenerations of the metal filter, degradation or leakage of the DPF can be determined.

FIGS. 1 and 2 show example configurations of the soot sensing assembly with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Figure 3:
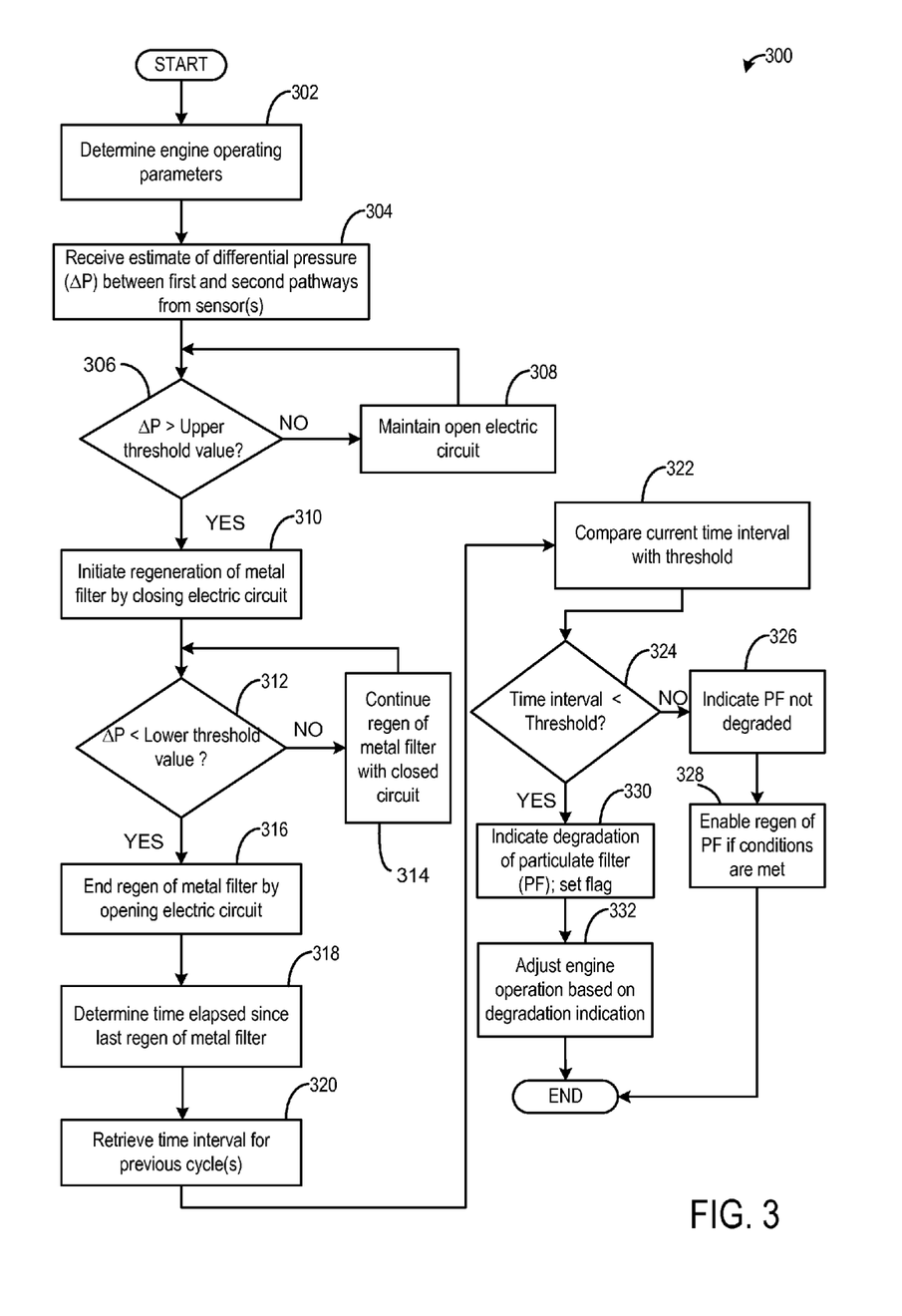
FIG. 3 shows a flow chart illustrating a method that may be implemented for diagnosing degradation of a DPF in the exhaust pipe based on the pressure or temperature-based soot sensor.

FIG. 3 illustrates an example method 300 for diagnosing degradation of an exhaust particulate filter in an engine exhaust passage. The method diverts exhaust gas from downstream of a first filter into each of parallel first and second pathways, the second pathway including a second filter coupled to an electric circuit, and then indicates degradation of the first filter based on an interval between successive regenerations of the second filter. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, the routine includes estimating and/or measuring current engine operating parameters. Parameters assessed may include, for example, engine load, engine speed, vehicle speed, manifold vacuum, throttle position, exhaust pressure, exhaust air/fuel ratio, etc.

At 304, the routine includes determining a pressure or temperature differential across the first and second pathways of the sensor assembly. The difference in pressure or temperature is estimated by one or more of a differential pressure sensor (such as differential pressure sensor 281 in FIG. 2) and a pair of temperature or pressure sensors (such as sensors 282 and 283 in FIG. 2) coupled to each of the first and second pathways, the pressure or temperature sensor(s) being coupled to the second pathway downstream of the second metal filter. The differential pressure sensor 281 may be coupled to the second pathway downstream of the second metal filter, and to the first pathway at a location that is substantially at the same length/distance from inlet as in second pathway. As such, as soot deposits on the metal filter, a pressure difference ($\Delta P$) (or temperature difference ($\Delta T$)) between the two pathways, and thereby an output of the differential pressure sensor, or a difference in output of the pair of pressure/temperature sensors, may proportionally increase.

At 306, the routine includes determining if the differential pressure ($\Delta P$) is greater than a pre-determined threshold value. Alternatively, it may be determined if the differential temperature is greater than the pre-determined threshold value. Herein, the threshold is an upper threshold above which the metal filter in the second pathway may have to be regenerated. The upper threshold value may be based on engine operating conditions, such as engine load and/or the soot load of the filter. In one example, the upper threshold for regenerating the second metal filter may be function of an upper threshold for regenerating the first filter. Alternatively, the upper threshold may be a fixed value based on the specific configuration and dimensions of the metal filter. If $\Delta P$ is lower than the threshold value, the routine proceeds to 308 to maintain the switch of the electric circuit in the open position. In addition, the controller continues monitoring the $\Delta P$ between the two pathways. When the switch of the electric circuit coupled to the second metal filter in the second pathway is in the open position, no current flows through the circuit, and regeneration of the metal filter is not initiated.

If the pressure or temperature difference ($\Delta P$) is higher than the upper threshold value, the routine proceeds to 310 where the controller (such as controller 12 of FIG. 1) sends a signal to actuate the switch of the electric circuit coupled to the metal filter to a closed position in order to complete the circuit. On circuit completion, electricity (that is, an electric current) flows through the metal filter and regeneration of the filter starts. In this way, the second filter is regenerated responsive to a differential pressure or differential temperature between the first and second pathways being higher than an upper threshold. As described above, by closing the circuit, the metal filter is heated electrically, effectively burning soot deposited on the filter. The regenerating of the second filter is continued with the switch of the electric circuit closed and by flowing electricity (current) through the second filter until the differential pressure or differential temperature between the first and second pathways is lower than a lower threshold. The lower threshold may be a function of the upper threshold, and may reflect a condition where the second filter is sufficiently clean. Thus, the switch may remain in the closed position until regeneration of the second metal filter is completed. During the regeneration process, the $\Delta P$ decreases proportionally with the reduction of the soot load.

At 312, the routine includes determining if the $\Delta P$ (as based on the output of the pressure or temperature sensor(s)) is less than a pre-determined second (lower) threshold value. The lower threshold, like the upper threshold, may be adjusted based on engine operating conditions, such as a soot load of the first filter, as well as the porosity of the second smaller metal filter. If the $\Delta P$ is higher than the second threshold pressure/temperature value, the routine moves to 314 where the controller continues with the regeneration process by maintaining the switch, and consequently the circuit closed.

Upon confirming that $\Delta P$ is lower than the second threshold value, at 316, the regeneration process may be stopped. Therein, the controller may send a signal to actuate the switch of the electric circuit coupled to the metal filter to an open position. As a result, current stops flowing through the circuit, terminating the regeneration.

In this way, the second filter is regenerated responsive to a differential pressure or differential temperature between the first and second pathways being higher than an upper threshold. Regenerating the second filter includes closing a switch of the electric circuit and flowing electricity through the second filter until the difference in pressure or temperature between the first and second pathways is lower than the lower threshold.

At 318, the routine includes determining a time elapsed since the last regeneration of the metal filter. As such, this corresponds to a time interval between the last regeneration and a current regeneration of the metal filter. Alternately, this may be determined as a time elapsed since a last opening of the switch. The interval is measured from initiation of a first regeneration event of the second filter to initiation of a second, immediately subsequent regeneration event of the second filter, with no regenerations in between. In one example, a timer may be started when a regeneration of the filter is completed (such as when the switch is opened at 316), the timer stopped when a subsequent regeneration of the filter is completed (such as when the switch is opened during a subsequent iteration of method 300. The time intervals between successive regenerations may be stored in the memory of the controller.

At 320, the routine includes retrieving the time interval for the previous cycle. In an alternate example, an average duration between successive regeneration events of the metal filter over a duration or distance of vehicle operation, or a threshold number of engine cycles may be determined. The number of previous cycles used to determine the average time interval may be varied.

At 322, the routine includes comparing the current time interval (determined at 318) to a threshold time interval, the threshold including the time interval for the previous cycle (or the retrieved average time interval) as determined at 320.

During standard engine operation and when the DPF operates without degradation, the amount of soot deposited on the metal filter after each regeneration cycle may be comparable, resulting in intermittent regenerations with a symmetric periodicity. However, with age and durability issues, when the DPF becomes degraded, an increasing amount of soot may escape uncaptured by the DPF, and travel downstream through the exhaust pipe. This increased soot load may partly accumulate on the metal filter and as a result, the metal filter may have to be regenerated (cleaned) more frequently.

At 324, the routine determines if the current time interval is less than the threshold value. If the time interval is not less than the threshold value, it may be determined at 326 that the DPF is not degraded. At 328, in response to an indication of no degradation of the DPF, periodic regeneration of the DPF is allowed to proceed once regeneration conditions are met and the routine ends. For example, in response to the time interval being greater than a threshold time interval, the particulate filter in the engine exhaust conduit may be regenerated when particulate filter regeneration conditions are met (e.g., when the soot load of the filter is higher than a threshold load) via one or more of retarding spark timing and decreasing an exhaust air/fuel ratio.

If the time interval is less than the threshold value, the routine proceeds to 330 to indicate degradation of the DPF. For example, it may be indicated that there is a leak, hole, crack, or other damage to the DPF. The indicating may include setting a flag or a diagnostic code, or activating a malfunction indicator lamp in order to notify the vehicle operator that the DPF is degraded and have to be replaced. In this way, degradation of a DPF is indicated responsive to the interval between successive regenerations of a metal filter, located downstream of the DPF, being lower than a threshold duration.

At 332, in response to the indication of degradation, the controller may adjust the operation of one or more engine actuators to adjust engine operation. As one example, in response to the indication of degradation, the controller may limit an engine load (e.g., by reducing an opening of an intake throttle), limit an engine torque output, and/or reduce boost pressure (e.g., by opening a wastegate coupled to an exhaust turbine or a bypass valve coupled to an intake compressor).

Figure 4:
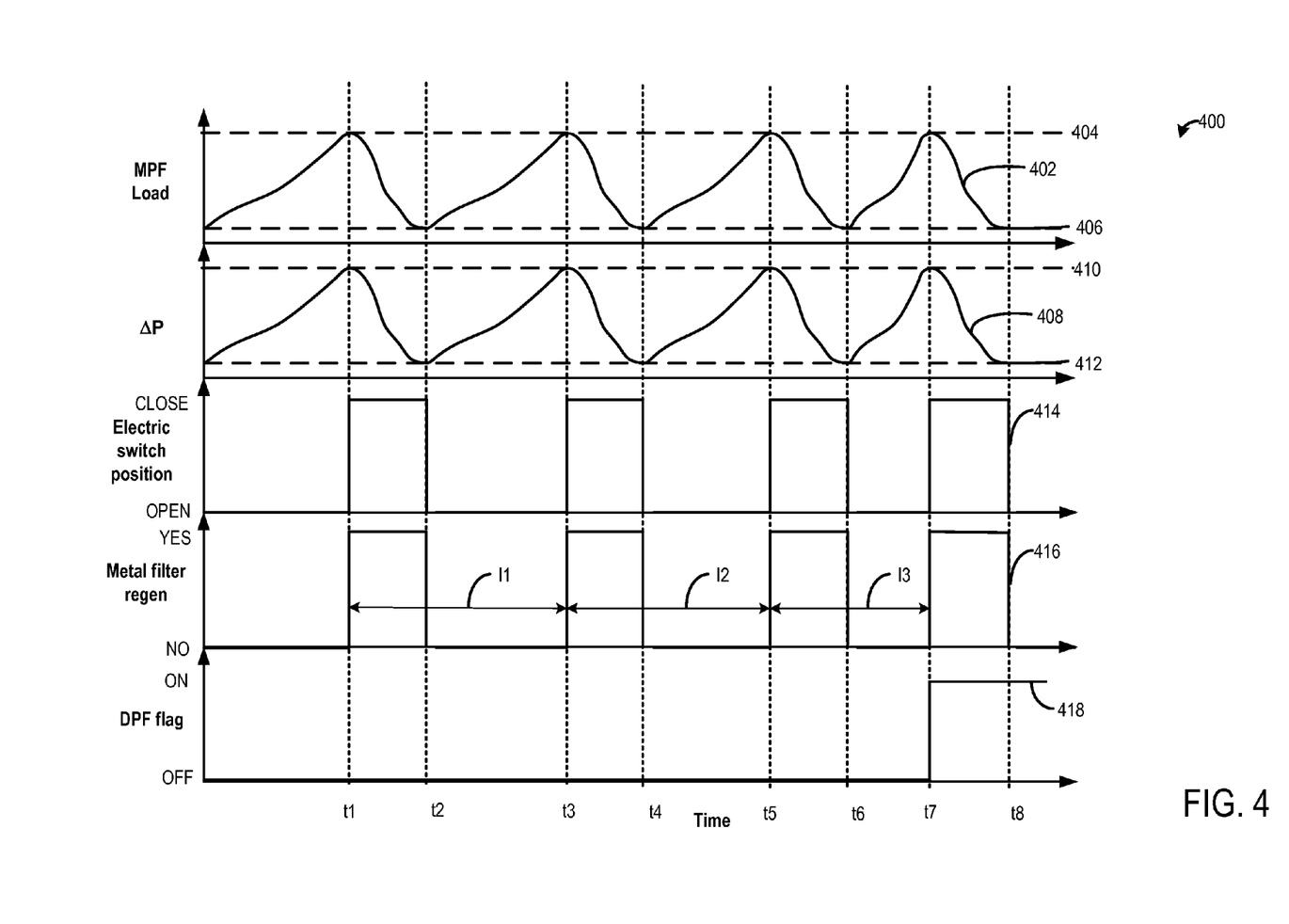
FIG. 4 shows an example of diagnosing a DPF based on the regeneration time of a metal filter coupled downstream of the DPF.

In this way, engine operation may be adjusted based on degradation of a particulate filter in an engine exhaust conduit, the degradation determined based on a time interval between a first regeneration and a second regeneration of a metallic filter. The metallic filter may be positioned in one of two parallel passages coupled to and positioned outside of the engine exhaust conduit, the two parallel passages positioned downstream of the particulate filter FIG. 4 shows an example operating sequence 400 illustrating an engine operating with a secondary soot sensor assembly (e.g., such as the secondary soot sensor assembly 200 shown in FIG. 2), and regenerating of a metal filter of the flow assembly. The method shows regenerating of the metal filter based on an output of a differential pressure sensor of the assembly, and indicating degradation of an upstream particulate matter filter based on an interval between successive regenerations of the metal filter. The horizontal (x-axis) denotes time and the vertical markers t1–t8 identify significant times in the operation of the soot sensor assembly.

The first plot from the top shows soot deposition (line 402) on the metal particulate filter (MPF) over time (herein also referred to as the MPF load). The upper and the lower limit values are marked by dotted lines 404 and 406, respectively. The second plot (line 408) shows the variation in differential pressure ($\Delta P$) between the two pathways of the secondary soot sensor assembly, as estimated by a differential pressure sensor coupled across the two pathways. The High and Low threshold values of the $\Delta P$ is shown by the dotted lines 410 and 412, respectively. The third plot (line 414) shows the electric switch position. The fourth plot (line 416) indicates regeneration of the MPF and the bottom plot (line 418) represents a flag indicating whether the DPF is degraded or not.

Prior to time t1, as a portion of exhaust is diverted from downstream of a DPF into the two pathways of the soot sensor assembly, a soot load on the metal filter gradually increases (line 402), in response to which a corresponding rise in the $\Delta P$ across the two pathways (line 408) is observed. The $\Delta P$ is proportional to the soot load. With increase in $\Delta P$, it can be inferred that there is an increase in soot load deposited on the MFP. As such, prior to t1, while the $\Delta P$ is below the upper threshold 410 and soot load is below the limit 404, a switch of the electric circuit of the soot assembly is held open and the MPF does not regenerate. If the switch is in the open state, the circuit is open and there is no flow of current through it, whereas, when the switch is in the closed state the electric circuit coupled to the MPF is complete and current flows through it. At t1, in response to the $\Delta P$ reaching the upper threshold value 410, the switch is closed, electric current starts flowing through the circuit and, regeneration of the metal filter is initiated. In addition, a timer is started upon initiation of the regeneration event.

Between t1 and t2, there is a decrease is $\Delta P$ from which it can be inferred that the MPF load decreases proportionally. At t2, in response to $\Delta P$ reaching lower threshold 412, it may be inferred that the soot load of the MPF has been sufficiently reduced and regeneration of the filter is terminated by actuating the switch of the electric circuit to the open position. After t2 and prior to t3, the $\Delta P$ increases indicating an increase in MPF soot load. During this time the regeneration remains disabled with the switch in the open position and the DPF degradation flag is off. At t3, similar to t1, in response to the $\Delta P$ reaching the upper threshold value 410, the switch is closed, electric current flows through the circuit and regeneration of the metal filter is initiated. At this point the timer records the time interval between the onset of the current MF regeneration (at t3) and that of the previous MF regeneration (t1). The time interval t1–t3 is denoted by I1.

If this time interval is less than a threshold time interval then the DPF may be degraded. The threshold time interval is based on a time elapsed between completion of a regeneration event immediately preceding the first regeneration and completion of the first regeneration, and wherein the time interval between the first regeneration and the second regeneration of the metallic filter includes a time elapsed between completion of the first regeneration and completion of the second regeneration. Threshold time interval may be based on average time interval between successive regeneration events for a predefined number of regeneration events and/or for a predefined duration or distance of vehicle travel/engine operation and/or a predefined number of engine cycles. In the current example, I1 is greater than the threshold and the degradation flag for the DPF is kept in OFF state. The timer is restarted at t3, upon initiation of the next regeneration event. In addition, due to no indication of degradation, regeneration of the DPF may be enabled when conditions are met, such as when a soot load of the DPF is determined to be sufficiently high.

Between t3 and t4, there is a decrease is ΔP indicating that the MPF load decreases proportionally during this interval. At t4, as the ΔP value reaches the lower threshold 412, it may be inferred that the soot load of the MPF has been sufficiently reduced. At this point the regeneration of MPF is complete and is terminated by actuating the switch of the electric circuit to the open position. The timer continues to record the time elapsed.

After t4 and prior to t5, the ΔP increases until it reaches the upper threshold 410 at t5, triggering regeneration. It can be inferred that during this time period the soot load depositing on the MPF also increases. At t5, regeneration is initiated by actuating the switch to the closed position. At this point the timer records the time interval between the onset of the current MF (t5) regeneration and that of the previous MF regeneration (t3). The time t3–t5 interval is denoted by I2. The time interval I2 is compared to I1 and/or a threshold value, if this time interval is less than the threshold time interval then the DPF may be degraded. In the current example, I2 is greater than I1 and the degradation flag is kept in OFF state. With the onset of the regeneration process at t5, the timer is restarted.

Between t5 and t6, regeneration of MPF continues and the ΔP value decreases until it reaches the lower threshold 412, where it can be inferred that the soot level on the metal filter has decreased to the lower limit. At t6, regeneration is completed and the switch for the electric circuit is opened. During this time the timer continues to record the time elapsed.

With the circuit open the MPF regeneration is suspended and as seen for previous time cycles the ΔP is seen to increase between t6 and t7 in response to the soot accumulation on the MPF. At t7, the ΔP reaches the upper threshold value 410 and in response the switch is actuated to a closed position starting the regeneration process. The time interval between the current and the previous regeneration, I3 is recorded by the timer as the time difference between t5 and t7. The time elapsed is compared to the time interval for the last regeneration cycle I2. In the depicted example, current time interval I3, is determined to be shorter than I2, as well as I1, and/or a threshold value (based at least on I2).

Therefore, in response to the time interval for the current regeneration cycle being smaller than the time interval for a previous regeneration cycle (or a threshold duration), it may be indicate that the DPF is degraded, by setting a flag at t7 (as shown at plot 418). The controller may then employ engine actuators of the engine system to adjust engine operation in response to the degradation of the DPF. For example, in response to the indication of degradation, regeneration of the DPF may be disabled. In addition, an engine torque output may be limited. However, regeneration of the metal filter may continue.

After t7, and prior to t8 the MPF regeneration process continues with the electric circuit closed. There is a reduction in the ΔP indicating burning off of soot deposit on the metal filter. However at this stage the DPF continues to be degraded and DPF regeneration continues to be discontinued. At t8, the metal filter regeneration is complete as the ΔP reaches the lower threshold value 412. Post t8, soot continues to deposit on the MPF, the soot level may stay low due to adjustments made in the engine by the controller in order to decrease soot output. In this way, DPF degeneration is diagnosed based on the regeneration time of a metal filter coupled downstream of the DPF.

While the example of FIG. 4 adjusts the regeneration of the metal filter responsive to the output of a differential pressure sensor, it will be appreciated that in alternate examples, the differential pressure may be based on the output of a pair of pressure sensors coupled to the first and second pathways, respectively. Further still, the differential pressure may be inferred based on the output of a pair of temperature sensors coupled to the first and second pathways, respectively. Furthermore, the regeneration of the metal filter may be performed responsive to a differential pressure between the pathways, as determined based on the output of a pair of temperature sensors coupled to the first and second pathways, respectively.

One example method for DPF leakage detection comprises diverting exhaust gas from downstream of a first filter into each of parallel first and second pathways, the second pathway including a second filter coupled to an electric circuit; and indicating degradation of the first filter based on an interval between successive regenerations of the second filter. In the preceding example, exhaust gas additionally or optionally flows from the exhaust pipe into an inlet pipe, and from the inlet pipe into each of the first and second exhaust pathways, the inlet pipe branching into the first and second pathways at a location external to the exhaust pipe; and further exhaust gas flows from the first and second pathways into the exhaust pipe via an outlet pipe, the first and second pathways converging into the outlet pipe, downstream of the second filter and external to the exhaust pipe. In any or all of the preceding examples, additionally or optionally, a direction of flowing exhaust gas through the inlet pipe and the outlet pipe is substantially perpendicular to a direction of exhaust flow through each of the exhaust pipe, and the first and second pathways. In any or all of the preceding examples, the difference in temperature is estimated by a pair of temperature sensors coupled to the first and second pathways, and wherein the difference in pressure may be additionally or optionally estimated by one of a pair of pressure sensors coupled to the first and second pathways, and a differential pressure sensor coupled to each of the first and second pathways, the differential pressure sensor coupled to the second pathway downstream of the second filter. In any or all of the preceding examples, regenerating the second filter responsive to one of a difference in pressure and a difference in temperature between the first and second pathways being higher than an upper threshold. In any or all of the preceding examples, the interval is additionally or optionally measured from initiation of a first regeneration event of the second filter to initiation of a second, immediately subsequent regeneration event of the second filter. In any or all of the preceding examples, regenerating the second filter additionally or optionally includes closing a switch of the electric circuit and flowing electricity through the second filter until the difference in pressure or temperature between the first and second pathways is lower than a lower threshold. In any or all of the preceding examples, DPF degradation may be additionally or optionally indicated in response to the interval between successive regenerations of the second filter being lower than a threshold duration. In any or all of the preceding examples, the method may additionally or alternatively further comprise, in response to the indication, limiting an engine load. wherein the difference in temperature is estimated by a pair of temperature sensors coupled to the first and second pathways, and wherein the difference in pressure is estimated by one of a pair of pressure sensors coupled to the first and second pathways, and a differential pressure sensor coupled to each of the first and second pathways, the differential pressure sensor coupled to the second pathway downstream of the second filter.

In another example, an engine exhaust system comprises: an exhaust pipe including a first particulate filter; a soot detection system including an inlet pipe and an outlet pipe coupled to the exhaust pipe, downstream of the first particulate filter, the inlet pipe bifurcating into parallel first and second tubes, the first and second tubes converging into the outlet pipe, the second tube including a second particulate filter coupled to a source of electricity via a switch; one or more sensors coupled to each of the first and second tubes for estimating a differential pressure across the first and second tubes; and a controller with computer readable instructions stored on non-transitory memory for: flowing exhaust gas through the inlet and outlet pipes, via the first and second tubes; regenerating the second filter based on an output of the one or more sensors; and adjusting engine operation based on a time elapsed between successive regenerations of the second filter. One or more temperature sensors may be coupled to each of the first and second tubes for estimating a differential temperature across the first and second tubes; and a controller. In the preceding example system, a portion of each of the inlet pipe and outlet pipe may be additionally or optionally coupled internal to the exhaust pipe while a remaining portion of each of the inlet pipe and outlet pipe is coupled external to the exhaust pipe, the inlet pipe bifurcating into the parallel first and second tubes external to the exhaust pipe, and the first and second tubes converging into the outlet pipe external to the exhaust pipe. In any or all of the preceding examples, the first tube is additionally or optionally disposed proximal to the engine exhaust pipe relative to the second tube, the second tube is disposed distal to the engine exhaust pipe relative to the first tube, and one or more of the first and second tubes additionally or optionally includes a venturi. In any or all of the preceding examples, the parallel first and second tubes additionally or optionally have substantially equal geometrical dimensions, the geometrical dimensions including length, width, and diameter. In any or all of the preceding examples, the inlet pipe additionally or optionally comprises a plurality of perforations on a side of the inlet pipe within the exhaust pipe and proximate to the first filter, a diameter of the perforations adjusted to enable conglomerated particulates to impinge on a side of the inlet pipe within the exhaust pipe and distal to the first filter, the conglomerated particulates released from the inlet pipe into the exhaust pipe via a perforation on a bottom of the inlet pipe. In any or all of the preceding examples, the one or more sensors include one of a single differential sensor coupled to each of the first and second tubes, first and second pressure sensors coupled to the first and second tubes respectively, and first and second temperature sensors coupled to the first and second tubes respectively, and wherein regenerating the second filter based on an output of the one or more pressure sensors includes initiating regeneration of the second filter when the output of the one or more sensors is indicative of a higher than threshold differential pressure, and terminating regeneration of the second filter when the output of the one or more sensors is indicative of a lower than threshold differential pressure. In any or all of the preceding examples, adjusting engine operation based on a time elapsed between successive regenerations of the second filter additionally or optionally includes regenerating the first filter when the time elapsed is higher than a threshold interval by retarding spark timing or enriching the exhaust gas, and indicating degradation of the first filter when the time elapsed is lower than the threshold interval, regeneration of the first filter discontinued responsive to the indication of degradation.

Another example method for an engine exhaust comprises adjusting engine operation based on degradation of a particulate filter in an engine exhaust conduit, the degradation determined based on a time interval between a first regeneration and a second regeneration of a metallic filter positioned in one of two parallel passages coupled to and positioned outside of the engine exhaust conduit, the two parallel passages positioned downstream of the particulate filter, the first and second regeneration based on a pressure or temperature differential across the two parallel passages. In the preceding example, the adjusting additionally or optionally includes: during a first condition, in response to the time interval being greater than a threshold time interval, regenerating the particulate filter in the engine exhaust conduit when particulate filter regeneration conditions are met via one or more of a retarding spark and decreasing an air/fuel ratio; and during a second condition, in response to the time interval being less than the threshold time interval, indicating to an operator degradation of the particulate filter and adjusting an engine actuator to reduce engine torque output. In any or all of the preceding examples, the pressure differential across the two parallel passages is estimated by one of a pressure sensor coupled between the two parallel passages, downstream of the metallic filter, a pair of pressure sensors coupled to the two parallel passages, and a pair of thermocouples coupled to the two parallel passages, and wherein the first and second regeneration based on a pressure differential across the two parallel passages additionally or optionally includes regenerating the metallic filter in response to the pressure differential being higher than an upper threshold, and maintaining the regenerating until the pressure differential is lower than a lower threshold. In any or all of the preceding examples, the threshold time interval is additionally or optionally based on a time elapsed between completion of a regeneration event immediately preceding the first regeneration and completion of the first regeneration, wherein the time interval between the first regeneration and the second regeneration of a metallic filter includes a time elapsed between completion of the first regeneration and completion of the second regeneration.

In a further representation, an engine exhaust system, comprises an exhaust pipe including a first particulate filter; a soot detection system including an inlet pipe and an outlet pipe coupled to the exhaust pipe, downstream of the first particulate filter, the inlet pipe bifurcating into parallel first and second tubes, the first and second tubes converging into the outlet pipe, the second tube including a second particulate filter coupled to a source of electricity via a switch; one or more temperature sensors coupled to each of the first and second tubes for estimating a differential temperature across the first and second tubes; and a controller. The controller may be configured with computer readable instructions stored on non-transitory memory for: flowing exhaust gas through the inlet and outlet pipes, via the first and second tubes; regenerating the second filter based on an output of the one or more sensors; and adjusting engine operation based on a time elapsed between successive regenerations of the second filter.

In yet another representation, a method for an engine exhaust, comprises: adjusting engine operation based on degradation of a particulate filter in an engine exhaust conduit, the degradation determined based on a time interval between a first regeneration and a second regeneration of a metallic filter positioned in one of two parallel passages coupled to and positioned outside of the engine exhaust conduit, the two parallel passages positioned downstream of the particulate filter, the first and second regeneration based on a temperature differential across the two parallel passages. In the preceding example, the temperature differential across the two parallel passages is estimated based on the output of a pair of temperature sensors coupled to the two parallel passages, respectively. In any or all of the preceding examples, the pair of temperature sensors may include a pair of thermocouples.

In this way, by diverting a portion of exhaust gas from an exhaust pipe to a secondary soot sensor assembly with a metal filter, located downstream of a diesel particulate filter, degradation of a particulate filter can be detected accurately. The exhaust gas on entering the secondary soot sensor assembly flows through two identical pathways, one without any hindrance and the other fitted with a metal filter and an electric circuit across it. By relying on a differential pressure between the central portions of the two pathways to estimate the loading of the metal filter, the requirement for multiple pressure sensors or flow sensors in each pathway is reduced, without reducing an accuracy of estimating the soot load of the metal filter soot. By trapping aggregated particulates and water droplets in an inlet pipe of the soot sensor, and redirecting them to the exhaust tailpipe, corruption of sensor results due to impingement of aggregates and water droplets is reduced. By rendering the soot sensor more accurate and reliable, emissions compliance is increased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
diverting exhaust gas from downstream of a first filter into each of parallel first and second pathways, the second pathway including a second filter coupled to an electric circuit; and indicating degradation of the first filter based on an interval between successive regenerations of the second filter; wherein
the indicating includes indicating degradation responsive to the interval between successive regenerations of the second filter being lower than a threshold duration.

2. The method of claim 1, further comprising, in response to the indication, limiting an engine speed or load.

3. The method of claim 1, wherein the interval is measured from initiation of a first regeneration event of the second filter to initiation of a second, immediately subsequent regeneration event of the second filter.

4. The method of claim 1, further comprising, regenerating the second filter responsive to one of a difference in pressure and a difference in temperature between the first and second pathways being higher than an upper threshold.

5. The method of claim 4, wherein the difference in temperature is estimated by a pair of temperature sensors coupled to the first and second pathways, and wherein the difference in pressure is estimated by one of a pair of pressure sensors coupled to the first and second pathways, and a differential pressure sensor coupled to each of the first and second pathways, the differential pressure sensor coupled to the second pathway downstream of the second filter.

6. The method of claim 4, wherein regenerating the second filter includes closing a switch of the electric circuit and flowing electricity through the second filter until the difference in pressure between the first and second pathways is lower than a lower threshold.

7. The method of claim 1, wherein the first filter is a larger diesel or gasoline particulate matter filter having a higher soot capacity, and wherein the second filter is a smaller metal filter having a lower soot capacity, and wherein the indicating includes indicating the first filter is leaking by setting a diagnostic code.

8. The method of claim 1, wherein the diverting includes:
flowing exhaust gas from an exhaust pipe into an inlet pipe, and from the inlet pipe into each of the first and second exhaust pathways, the inlet pipe branching into the first and second pathways at a location external to the exhaust pipe; and
flowing exhaust gas from the first and second pathways into the exhaust pipe via an outlet pipe, the first and second pathways converging into the outlet pipe, downstream of the second filter and external to the exhaust pipe.

9. The method of claim 8, wherein a direction of flowing exhaust gas through the inlet pipe and the outlet pipe is substantially perpendicular to a direction of exhaust flow through each of the exhaust pipe, and the first and second pathways.

10. An engine exhaust system, comprising:
an exhaust pipe including a first particulate filter;
a soot detection system including an inlet pipe and an outlet pipe coupled to the exhaust pipe, downstream of the first particulate filter, the inlet pipe bifurcating into parallel first and second tubes, the first and second tubes converging into the outlet pipe, the second tube including a second particulate filter coupled to a source of electricity via a switch;
one or more sensors coupled to each of the first and second tubes for estimating a differential pressure across the first and second tubes; and
a controller with computer readable instructions stored on non-transitory memory for:
flowing exhaust gas through the inlet and outlet pipes, via the first and second tubes;
regenerating the second filter based on an output of the one or more sensors; and
adjusting engine operation based on a time elapsed between successive regenerations of the second filter.

11. The system of claim 10, wherein a portion of each of the inlet pipe and outlet pipe is coupled internal to the exhaust pipe and a remaining portion of each of the inlet pipe and outlet pipe is coupled external to the exhaust pipe, wherein the inlet pipe bifurcates into the parallel first and second tubes external to the exhaust pipe, and wherein the first and second tubes converge into the outlet pipe external to the exhaust pipe.

12. The system of claim 10, wherein the parallel first and second tubes have substantially equal geometrical dimensions, the geometrical dimensions including length, width, and diameter, and wherein the inlet pipe comprises a plurality of perforations on a side of the inlet pipe within the exhaust pipe and proximate to the first filter, a diameter of the perforations adjusted to enable conglomerated particulates to impinge on a side of the inlet pipe within the exhaust pipe and distal to the first filter, the conglomerated particulates released from the inlet pipe into the exhaust pipe via a perforation on a bottom of the inlet pipe.

13. The system of claim 10, wherein the one or more sensors include one of a single differential sensor coupled to each of the first and second tubes, first and second pressure sensors coupled to the first and second tubes respectively, and first and second temperature sensors coupled to the first and second tubes respectively, and wherein regenerating the second filter based on an output of the one or more pressure sensors includes initiating regeneration of the second filter when the output of the one or more sensors is indicative of a higher than threshold differential pressure, and terminating regeneration of the second filter when the output of the one or more sensors is indicative of a lower than threshold differential pressure.

14. The system of claim 13, wherein adjusting engine operation based on a time elapsed between successive regenerations of the second filter includes regenerating the first filter when the time elapsed is higher than a threshold interval by retarding spark timing or enriching the exhaust gas, and indicating degradation of the first filter when the time elapsed is lower than the threshold interval, regeneration of the first filter discontinued responsive to the indication of degradation.

15. A method, comprising:
adjusting engine operation based on degradation of a particulate filter in an engine exhaust conduit, the degradation determined based on a time interval between a first regeneration and a second regeneration of a metallic filter positioned in one of two parallel passages coupled to and positioned outside of the exhaust conduit, the two parallel passages positioned downstream of the particulate filter, the first and second regeneration based on a pressure differential across the two parallel passages; wherein the adjusting includes
during a first condition, in response to the time interval being greater than a threshold time interval, regenerating the particulate filter in the engine exhaust conduit when particulate filter regeneration conditions are met via one or more of a retarding spark and decreasing an air/fuel ratio; and
during a second condition, in response to the time interval being less than the threshold time interval, indicating to an operator degradation of the particulate filter and adjusting an engine actuator to reduce engine torque output.

16. The method of claim 15, wherein the pressure differential across the two parallel passages is estimated by one of a pressure sensor coupled between the two parallel passages, downstream of the metallic filter, a pair of pressure sensors coupled to the two parallel passages, and a pair of thermocouples coupled to the two parallel passages, and wherein the first and second regeneration based on a pressure differential across the two parallel passages includes regenerating the metallic filter in response to the pressure differential being higher than an upper threshold, and maintaining the regenerating until the pressure differential is lower than a lower threshold.

17. The method of claim 15, wherein the threshold time interval is based on a time elapsed between completion of a regeneration event immediately preceding the first regeneration and completion of the first regeneration, and wherein the time interval between the first regeneration and the second regeneration of a metallic filter includes a time elapsed between completion of the first regeneration and completion of the second regeneration.

* * * * *